Patented Apr. 23, 1940

2,197,820

UNITED STATES PATENT OFFICE 2,197,820

BAKED GOODS, BAKED GOODS MIX, AND THE PROCESS OF MAKING THE SAME

William R. Voss, Milwaukee, Wis.

No Drawing. Application May 29, 1937, Serial No. 145,513

7 Claims. (Cl. 99—92)

The present invention relates to improvements in baked, fried and toasted goods such as cakes, cookies, doughnuts, fried cakes, muffins and the like, mixes for such goods, and the process of making such goods, being particularly concerned with such products and various methods of making the same embodying a homogenized mix.

Homogenization of such dairy products as milk and ice cream mixes has long been practiced to finely divide the globules of butter fat. The possible advantages, however, of homogenized mixes in connection with baked, fried and toasted goods has not been fully recognized and appreciated.

It is quite generally admitted that present methods of combining the ingredients of such goods even by a commercial baker does not lend itself to uniformly dependable results. In the home, baked, fried and toasted goods of high quality and texture are only obtained in a minority of the attempts and anything approaching uniformity of result is only obtained by the most experienced persons. From time to time prepared dry packaged mixes have appeared upon the market for the purpose of lessening the effort involved in making such goods in the home and to permit more uniform results but the same have met with only mediocre success. This has undoubtedly been for the reason that in the prepared dry mixes the normally fresh ingredients appear in a dehydrated form which, upon being placed in suspension and/or solution, do not impart to such goods the same quality and texture as obtained with the fresh ingredients.

One of the objects of the present invention is to provide uniformity of quality and texture in baked, fried and toasted goods by departing from the present accepted method of creaming and beating the sugar, shortening, eggs and liquid together through the homogenization of such ingredients as a wet mix.

Another object is to provide a homogenized wet mix, for the aforesaid goods, of the normally creamed and beaten ingredients which is stable and which requires only the addition of flour and leavening agents to provide products having uniform texture and quality.

Another object is to provide a homogenized wet mix of the major ingredients of such goods normally associated prior to the addition of flour to form a dough.

A further object is to provide such goods comprising homogenized normally creamed and beaten ingredients, flour and leavening agents.

A still further object is to provide a mix of the aforesaid type comprising the fats, carbohydrates, proteins and liquids in finely divided suspension and/or solution in which the proportion of carbohydrates is sufficient to preserve the mix.

Another object is to provide food products embodying a dough in which the major ingredients with the exception of flour and leavening agents have been homogenized and in which leavening agents are used for leavening.

Another object is to provide food products embodying a yeast raised dough in which the major ingredients have been homogenized with the exception of flour and including the yeast.

These and other objects and advantages of the present invention will more fully appear from consideration of the following detailed description.

The nature and scope of the invention is defined in the appended claims.

The carrying out of the process herein described and claimed in connection with the homogenization of wet mixes for baked, fried, and toasted goods does not necessarily involve any special equipment as satisfactory results may be obtained in connection with the use of the homogenizers that are now upon the market and being used in connection with dairy products. However, it undoubtedly will be found desirable in many instances to modify or alter existing homogenizers so as to more readily adapt the same for use in connection with such wet mixes and the handling thereof.

Without limiting the present invention to the enumerated steps and ingredients, except as appears from the annexed claims, the present invention may perhaps be best understood by specific reference to one possible manner in which the present invention may be put into use. In the preparation of a cake the shortening, sugar, liquid, salt and flavoring are stirred together but without any necessity of creaming together any of the ingredients as has been the practice in the past. If the resulting wet mix is not to be used immediately but is to be packaged or set aside for future use only sufficient liquid to dissolve the sugar is used. Generally speaking one part by weight of liquid will dissolve approximately three parts by weight of sugar. In this way the average wet mix will contain about forty per cent sugar by weight which is adequate to preserve the mix against spoilage. The resulting mix is then heated, thus further fluidizing the same, is passed through a homogenizer, and is immediately packaged. When the mix is to be used it is only necessary to add flour and leavening agents thereto. If the liquid content of the mix has been reduced then it will be necessary to add additional liquid at the time the flour and leavening agents are added. Very satisfactory results have been obtained in the making of cakes by using one part of such concentrated homogenized wet mix embodying the normally creamed and beaten ingredients, one part skimmed or whole milk and two parts flour with leavening agents added.

It is contemplated that the homogenized wet mix of sugar, shortening, eggs and liquids following heating and homogenization will be packaged in air tight containers of conventional construction, and thereafter distributed to bakers and homes for use when desired. In this manner the baker and the housewife through the simple procedure of adding additional liquid, flour and leavening agents can produce goods of uniform texture and quality. By laboratory control of the homogenized mix a cake can be produced by an inexperienced person more moist and of finer grain and texture than is possible at the present time employing present practices by the most experienced person. Where the homogenized mix is to be manufactured at a central point for wide distribution for domestic use, the mix will preferably be put up in sealed cans and packages, the contents of which, when mixed with easily and accurately ascertained proportions of liquid, flour and leavening agents will produce cakes of like quality as to moistness, texture, grain and flavor.

The fact that I am able to process the fresh ingredients of the homogenized mix without dehydration and yet have a staple mix which improves with age is considered to be a very important feature of this invention and as contributing materially to the improved results secured when compared with prepared dry mixes. While there is no necessity of making any departure from standard formulas for cakes, cookies and the like, as to the ingredients and amount thereof it has been my experience that even finer quality goods may be obtained by the use of a slightly increased amount of shortening. This fact is probably attributable to the fine dispersion of the shortening in the homogenized mix.

In its broader aspects the present invention is deemed to comprise the association of the major ingredients of food product mixture of the aforesaid types which are usually creamed and/or beaten together, commingling such ingredients, elevating the temperature of the mixture, homogenizing, preferably packaging and aging before use, then prior to baking, toasting or frying adding flour and leavening agents in cases where yeast is not part of the homogenized mixture.

The inclusion or exclusion of minor ingredients such as flavoring, salt, and the like, from the homogenized mix is a matter of choice, however, they are preferably included. It is not my intention to specifically limit the invention to all the ingredients that may enter into the homogenized mix as I consider the present invention to broadly reside in the associating of the major fresh and creamed ingredients of baked, fried and toasted goods into a homogenized mix.

One of the advantages of the present invention resides in the elimination of time and effort heretofore involved in creaming together certain ingredients of baked, fried and toasted goods. Such a creaming operation prior to homogenization of the wet mix may be included without departing from the present invention, although a general mixing or commingling of the ingredients is all that has been found necessary in order to obtain a satisfactory wet mix.

In the appended claims the term "baked goods" is intended to include fried goods, toasted goods and the like as well.

Having thus described my invention what I desire to secure by Letters Patent and claim is:

1. In the process of making baked goods, the step comprising homogenizing at fluidizing temperatures a mixture of the normally creamed and beaten ingredients namely, the sugar, eggs, shortening and liquid.

2. As steps in the process of making baked goods comprising associating the major ingredients, namely, the sugar, eggs, shortening and liquid into a mixture, with the exception of flour, leavening agents and liquid added at the time the dough is prepared, elevating the temperature of such mixture to fluidize, and homogenizing the same.

3. In the process of making baked goods, the step of making up a dough, in which leavening agents are used, from a homogenized mixture of sugar, shortening, eggs and liquid.

4. In the process of making baked goods from raised dough comprising the step of adding flour and other ingredients to a homogenized mixture containing yeast, sugar, shortening, eggs, and liquid.

5. A process of preparing a wet mix for the making of baked goods comprising the steps of homogenizing a mixture of eggs, sugar, shortening and liquid, and then packaging the same without sterilization for future use.

6. As an article of manufacture to be packaged and distributed for future use, a wet mix finely dispersed in a manner characteristic of homogenization for baked goods to which flour and leavening agents are to be added at the time of baking, said mix comprising the ingredients usually progressively creamed and beaten together just prior to baking, namely, sugar, eggs, shortening and liquid, said mix being stable with all of said ingredients in either solution or suspension.

7. An article of manufacture as defined in claim 6, in which the sugar content is sufficiently high to avert spoilage without use of other preservatives so as to permit packaging without sterilization and storage without refrigeration.

WILLIAM R. VOSS.